Feb. 15, 1949.  G. LE ROY  2,461,989
SIGHT GLASS ASSEMBLY
Filed Feb. 28, 1946

Gene Le Roy
INVENTOR.

BY *CA Snowles*
ATTORNEYS.

Patented Feb. 15, 1949

2,461,989

UNITED STATES PATENT OFFICE 2,461,989

SIGHT GLASS ASSEMBLY

Gene Le Roy, South Charleston, W. Va.

Application February 28, 1946, Serial No. 650,998

1 Claim. (Cl. 220—82)

This invention relates to a sight glass assembly for use in connection with vacuum pressure service.

By way of explanation, it may be stated that in sight glass assemblies of known construction, used in vacuum pressure service, glass breakage is frequent, due to the excessive pressure necessarily directed against the upper and lower surfaces of the sight glass, when the usual flange bolts of the assemblies are tightened, in providing a perfect seal, particularly when the bolts are unequally tightened.

It is therefore the object of the present invention, to provide a sight glass assembly wherein the gasket pressure is applied to the glass, radially against the edge of the sight glass, to the end that glass breakage, due to high gasket pressure, is eliminated.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawing

Figure 1:
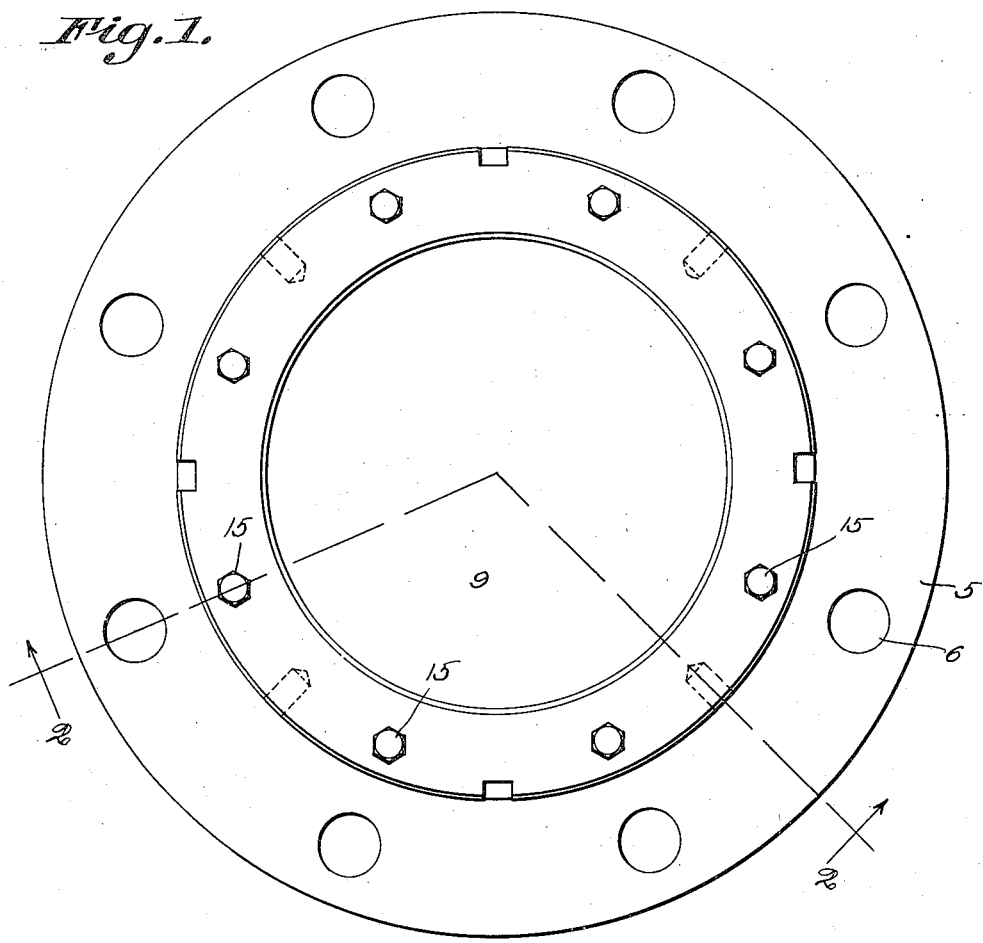
Figure 1 is an elevational view of a sight glass assembly constructed in accordance with the invention.

Referring to the drawing in detail, the reference character 5 indicates the body portion or flange ring, which is provided with stud bolt openings 6, whereby the device may be bolted in position on a tank.

As shown, the body portion or flange ring is formed with a flat shoulder 7 which provides a support for the lower cushion gasket 8 against which the sight glass 9 rests. The inner surface of the body portion or flange ring is beveled at 10 and merges into the vertical wall 11, providing a wide space between the outer edge of the sight glass 9, and wall of the body portion or flange ring 5. Mounted within the space between the edge of the sight glass and wall of the body portion or flange ring, are annular packing members 12, the outermost annular packing members having beveled outer surfaces, the beveled surface of the inner packing member resting on the beveled surface 10 of the body portion or flange ring.

The upper annular packing member 12 is engaged by the packing adjusting ring 13 that is beveled to fit the beveled construction of the annular packing member with which it engages. This ring 13 has an annular extension 13' that is disposed within the annular groove 14' of the retainer ring 14, to be engaged by the cap screws 15 that are threaded in cap screw openings formed in the retainer ring 14.

Figure 2:
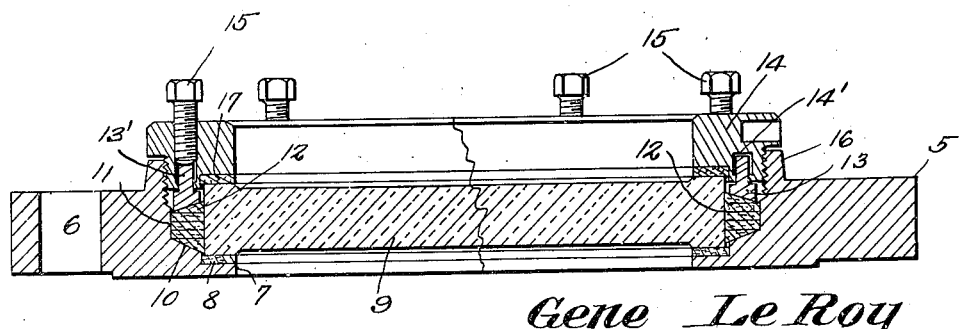
Figure 2 is a sectional view taken on line 2—2 of Fig. 1.

The retainer ring 14 is threaded in the upstanding annular flange 16 formed integral with the body portion or flange ring 5, as clearly shown by Fig. 2 of the drawing.

The reference character 17 indicates the upper cushion gasket that rests on the upper surface of the sight glass 9 to be engaged by the retainer ring 14, as it is moved into clamping relation with the sight glass 9.

Formed in the outer edge of the retainer ring 14, are spanner wrench openings to permit a spanner wrench to be used in rotating the retainer ring to its proper position with respect to the sight glass. When the retainer ring has been properly positioned, the cap screws 15 are rotated, directing pressure against the extensions 13' of the packing adjuster ring 13, forcing the annular packing member 12 into close engagement with the edge of the sight glass 9, providing a tight connection between the sight glass 9 and body portion or flange ring 5 to prevent leakage at this point, and at the same time provide means for securely holding the sight glass in position.

From the foregoing it will be seen that due to the construction shown and described, I have provided means for securing a sight glass within a flanged ring, in such a way that a tight connection will be had between the ring and sight glass, without the necessity of directing pressure to the upper and lower surfaces of the sight glass, which usually results in glass breakage.

What is claimed is:

A sight glass assembly comprising a flange ring, an inwardly extended annular shoulder formed on the ring, a sight glass resting on the shoulder, said flange ring having a beveled surface above the shoulder, packing members fitted between the flange ring and sight glass and resting on the beveled surface, a packing adjusting ring having a beveled surface contacting with the uppermost packing member and an upwardly extending integral annular extension thereon, a retainer ring secured to the flange ring above the packing adjusting ring and having an annular groove in the bottom thereof into which the annular extension of the packing adjusting ring extends, and cap screws extending into the retainer ring and engaging the packing adjusting ring whereby the packing adjusting ring is forced against the packing members forcing them into close engagement with the flange ring and sight glass, providing an air-tight connection therebetween.

GENE LE ROY.

REFERENCES CITED

The following references are of record in the file of this patent:

UNITED STATES PATENTS

| Number | Name | Date |
| --- | --- | --- |
| 12,454 | Hodges et al. | Feb. 20, 1906 |
| 1,995,395 | Mohr | Mar. 26, 1935 |

FOREIGN PATENTS

| Number | Country | Date |
| --- | --- | --- |
| 4,170 | Great Britain | 1898 |